UNITED STATES PATENT OFFICE.

SOLOMON M. EISEMAN, OF NEW YORK, N. Y.

TREATING VOLATILE AND INFLAMMABLE FLUIDS AND OILS.

SPECIFICATION forming part of Letters Patent No. 294,978, dated March 11, 1884.

Application filed December 20, 1883. (No specimens.) Patented in England August 16, 1883, No. 3,972.

*To all whom it may concern:*

Be it known that I, SOLOMON M. EISEMAN, of the city, county, and State of New York, have invented certain new and useful Improvements in Treating Volatile and Inflammable Fluids and Oils, of which the following is a full, clear, and exact description.

The object of this invention is to treat volatile and inflammable fluids and oils—such as crude petroleum, kerosene, turpentine, or other greasy manufactured products, whether they are of light or heavy specific gravity, of mineral, vegetable, or animal origin—in such a manner that they will be converted into a hardened, compact mass, block, or cake, to facilitate transportation and storage, as well as for other industrial purposes.

A further object of the invention is to form a new and improved hard combustible body adapted for illuminating or heating purposes by hardening the said solidified or partly-solidified oil by combining it with combustible substances, either alone or with any suitable binding, cementitious, or viscous substance, or combination of the same.

This invention relates to certain new and useful improvements in treating volatile and inflammable fluids and oils, for which Letters Patent No. 282,970 were issued to me on the 14th day of August, 1883.

In carrying out the invention the inflammable or volatile fluid or oil—such as petroleum, kerosene, turpentine, &c., or their fluid manufactured products or other oil—is mixed with acid, which acid may be incorporated in any suitable manner or through any suitable conveying medium. In place of the acid, a salt or substance having acid properties or which has been acidulated can be used. A fatty substance, gum-resin, asphaltum, pitch, or suitable wax, or a combination of some of the above-mentioned or similar substances, if not contained in the oil under treatment, is added to, mixed, or combined with the mixture of oil and acid, or to a mixture of oil and a substance which has been acidulated. If desired, the fatty substance, gum-resin, asphaltum, wax, or combination of the same, can be first mixed with the oil—that is, melted and then combined—and the acid, acidulated substance, or substance having acid properties can be added separately without affecting the desired final result. The above mixture of the oil with acid (acidulated substance or substance having acid properties) and of the fatty substance, resin, gum-resin, asphaltum, pitch, wax, &c., or combination of the same, is then combined or mixed with a metallic oxide or an alkaline substance, either dry, fluid, or gaseous, either heated or cold, whereby granules or more or less solid or semi-solid masses of the thickened hydrocarbon oils are produced. To the oil which has been solidified, partly solidified, thickened, or granulated in the manner described above, a material having viscous, gelatinous, cementitious, or binding properties, or a combination thereof, is added and thoroughly mixed with the said thickened oil or fluid for the purpose of binding the particles together and forming a more or less solid or hardened mass which has been previously dehydrated by melting, draining, or any other suitable means. Among the viscous, gelatinous, cementitious, or binding substances which may be used are, silicates of soda or potash, aluminates of soda or potash, acidulated earths—such as alum, sulphate of lime or alumina—starch, gum, glue, or gelatine, with or without chromic acid, soaps, &c. By adding, as stated above, the viscous, gelatinous, cementitious, or binding substance, the thickened, solidified, or granulated oil thereby hardened or compacted can be molded or shaped into a mass, block, or cake of any desired shape.

A combustible substance can be incorporated with the mass, &c., which can either be in a pulverized, fluid, or semi-fluid state. The said combustible substance may serve as the binding material referred to previously—that is, the said combustible substance can have viscous, gelatinous, or cementitious properties. The combustible substance can also be added to the mixture of thickened or partly-solidified oil and the viscous, gelatinous, cementitious, or binding substance.

The thickened or partly-solidified oil can be provided with a protective coating to guard or protect it from atmospheric or other influences, and to partly prevent the evaporation of the oil and the escape of gases or materials incorporated with the thickened or partly solidified oil, for the purpose above stated. The substance which is to form the protective coating, or the substance to be mixed with the thickened or partly-solidified oil for the purpose of protecting it, can consist of earths or combinations thereof, or any other suitable substance that will afford resistance to atmospheric or other influences; or, in other words, the protective material can be applied on the surface of the block or cake, or it can be incorporated with the thickened or partly-solidified oil, so that each particle of the thickened or solidified oil will be supplied with a protective substance. For instance, if glue treated with chromic acid or bichromate of potash, &c., is mixed with thickened or partly-solidified oil, those particles of glue on the outer surfaces of the block or cake will be rendered insoluble by the action of the light, and will thus afford a protective coating on the surface of the block or cake; or the block or cake can be shaped and formed and then a coating of protective material can be applied on the block or cake, which coating, in this case, would consist of glue or gelatine treated before or after application with chromic acid, bichromate of potash, &c. The protective coating can be applied to the surfaces of the block in a fluid or semi-fluid state by any suitable means.

The thickened or partly-solidified oil can be combined with the protective substance, or the mixture of partly-solidified oil and viscous, gelatinous, cementitious, or binding substance can be combined with the protective substance, or the mixture of thickened or partly-solidified oil, the viscous substance, and the combustible substance can be mixed with the protective substance, as may be desired.

Among some of the combustible substances that can be mixed with the thickened or partly-solidified oil, as mentioned above, are coal or coke dust, sawdust, fats, solid or semi-solid, wax, soaps, solid or semi-solid, gum-resins, resins, asphaltum, pitch, or similar substances or combinations thereof.

It will be seen that some of the substances above mentioned also have viscous or binding properties.

The thickened, solidified, or hardened oil, mixed with the combustible substance described above, can be used as fuel, or can be shaped into candles, which may be provided with wicks or may be used for illumination without wicks.

The thickened, partly-solidified, or solidified oil, as well as the hardened product of suitable combinations, can be used as a soap-body.

As has been previously stated, the oil under treatment is mixed with an alkaline substance or a metallic oxide for the purpose of thickening, granulating, or solidifying the oil or fluid. To this oil or fluid, fatty substances, resins, gum-resins, asphaltum, pitch, wax, &c., or combinations of the same, are added, if necessary. It has also been stated that the alkaline substance can be added in either a dry, fluid, or gaseous state, and I wish to state here that the alkaline substance used in producing illuminating masses is preferably to be of a volatile nature—that is, of such a nature that it can be volatilized by the heat produced by burning the thickened or hardened oil or fluid. The said volatile alkaline substance or substances having alkaline properties can be mixed with the oil in either a dry, fluid, or gaseous state. For instance, the dry alkaline substance can be mixed with the oil, a solution of the alkaline substance can be mixed with the oil, or the alkaline substance can be converted into a gas and the oil saturated with the said gas. I deem it necessary to make the above specific statement to avoid misunderstanding.

Any or all of the above-described operations—that is, the mixing of the oil with the ingredients for granulating or partly solidifying it, or the mixing of the solidified, thickened, or partly-solidified oil with the viscous, gelatinous, cementitious, or binding substance—should preferably take place at a low degree of heat, and it can be advantageously carried on in vacuum, if desired, thus permitting the use of the equivalent of a comparatively high degree of heat without the loss of the volatile hydrocarbon oil under treatment by evaporation or distillation.

If the oil or fluid which has been thickened, partly-solidified, solidified, or hardened is to be regained in the liquid form, the block or cake is decomposed either by distillation, by treatment with acids, or in any other suitable manner.

Having thus described my invention, what I claim as new, and desire to secure by Letters Patent, is—

1. As a new article of manufacture, a hardened mass, block, or cake of granulated, thickened, partly solidified, or solidified, volatile and inflammable fluid or oil, substantially as described.

2. As a new article of manufacture, a hardened mass, block, or cake of thickened, partly-solidified, or solidified volatile and inflammable fluid or oil, combined or mixed with a combustible substance, substantially as described.

3. As a new article of manufacture, a hardened mass, block, or cake of thickened, partly-solidified, or solidified volatile and inflammable fluid or oil, combined or mixed with a viscous, gelatinous, cementitious, or binding substance, substantially as described.

4. As a new article of manufacture, a hardened mass, block, or cake of thickened, partly-solidified, or solidified volatile and inflammable fluid or oil, combined or mixed with a combustible substance, and a viscous, gelatinous, cementitious, or binding substance, substantially as described.

5. As a new article of manufacture, a hardened mass, block, or cake of thickened, partly-solidified, or solidified volatile and inflammable fluid or oil, combined or mixed with a substance or substances for the purpose of protecting the mass, block, or cake from atmospheric or other influences, substantially as described.

6. As a new article of manufacture, a hardened mass, block, or cake of thickened, partly-solidified, or solidified volatile and inflammable fluid or oil, combined or mixed with a viscous or binding material and an earthy or other protective substance, for the purpose of protecting the mass, block, or cake from atmospheric or other influences, substantially as described.

7. As a new article of manufacture, a hardened mass, block, or cake of solidified or thickened volatile and inflammable fluid or oil, provided with a coating for protecting the said mass, block, or cake from atmospheric and other influences, substantially as described.

8. As a new article of manufacture, a combination of oil with a volatile alkaline substance or substance having alkaline properties, substantially as described.

9. The herein-described process of producing hardened, weather-resisting blocks, cakes, or masses of volatile and inflammable fluid or oil, consisting in thickening, solidifying, or granulating the oil or fluid and then mixing it with an earth, substantially as described.

10. The herein-described process of producing hardened, weather-resisting blocks, cakes, or masses of volatile and inflammable fluid or oil, consisting in thickening, solidifying, or hardening the oil and providing it with a protective coating, substantially as described.

11. The herein-described process of mixing oils with other substances for the purpose of thickening, solidifying, or hardening the said oils, consisting in carrying out the said operation in vacuo, substantially as described.

SOLOMON M. EISEMAN.

Witnesses:
OSCAR F. GUNZ,
C. SEDGWICK.